Dec. 24, 1968   A. J. BONELL   3,417,551
AIR FILTER
Filed Nov. 16, 1965

ARTHUR J. BONELL
INVENTOR

BY John R. Faulkner
Keith L. Gerschler
ATTORNEYS

United States Patent Office 3,417,551
Patented Dec. 24, 1968

3,417,551
AIR FILTER
Arthur J. Bonell, Detroit, Mich., assignor to Ford Motor Company, Dearborn, Mich., a corporation of Delaware
Filed Nov. 16, 1965, Ser. No. 508,102
5 Claims. (Cl. 55—498)

ABSTRACT OF THE DISCLOSURE

An annular filter element provided with an elastomeric band bonded to the outer edges of the pleats.

This invention relates to a fluid filtering device and more particularly to a fluid filtering device adapted to be used as an air filter in conjunction with an internal combustion engine.

A problem associated with fluid filters and particularly air cleaners for the internal combustion engines of motor vehicles, is that a filter element, after a period of service, becomes clogged with dust, road grime and other foreign matter filtered from the air. The presence of these substances in the material of the filter element reduces the volumetric capacity of the air filter. Such a reduction in the volume of filtered air passing from the air filter into the charge forming device of an internal combustion engine impairs the operating efficiency of such an engine.

It has been found that practical cleaning methods for air filter elements do not restore the elements to their original condition. Also, such cleaning has been found to be inconvenient and a source of potential engine damage due to possible degradation of the filtering material by the cleaning process.

Therefore, conventional fluid filters incorporate a filter element that may readily be replaced. Replaceable air filter elements must be relatively inexpensive because air filter elements are a major replacement item attendant the maintenance of an internal combustion engine.

Replaceable filter elements in use today are conventionally designed in the shape of an annulus the filtering material itself being encased between permeable, rigid, inner and outer supporting members. Besides contributing heavily to maintenance cost of an internal combustion engine, these replacement air filter elements pose a problem to the manufacturers and suppliers of automotive equipment in that the rigid toroidal design of these filter elements necessitates the allocation of a large amount of storage space.

It is therefore the principal object of this invention to provide a fluid filter assembly capable of utilizing an easily replaceable filter element.

A further object of this invention is to provide a replaceable filter element that is inexpensive due to its simple design and ease of manufacture.

A still further object of this invention is to provide a replaceable filter element that will necessitate only a small amount of storage space.

A fluid filter assembly according to this invention includes two axially aligned case members arranged so as to permit the passage of air between them. A permeable continuous support screen is joined to one of the members and extends for at least a part of the distance between the members. Around this support screen is positioned a replaceable filter element comprising a continuous, endless length of pleated filtering material. Around the outer apexes of the pleats of this material is bonded a continuous. endless band of elastomeric material which urges the filtering material into engagement with the supporting screen. This construction allows the filter element to be turned "inside out" for storage as a compressed rectangular shape. Formed on opposing surfaces of the case members are two continuous seals. Each of these seals contacts one end portion of the filtering material to form a fluid tight seal between the case members and the filtering material.

Further objects and advantages of this invention will become more apparent when considered in conjunction with the accompanying drawing wherein.

Figure 1:
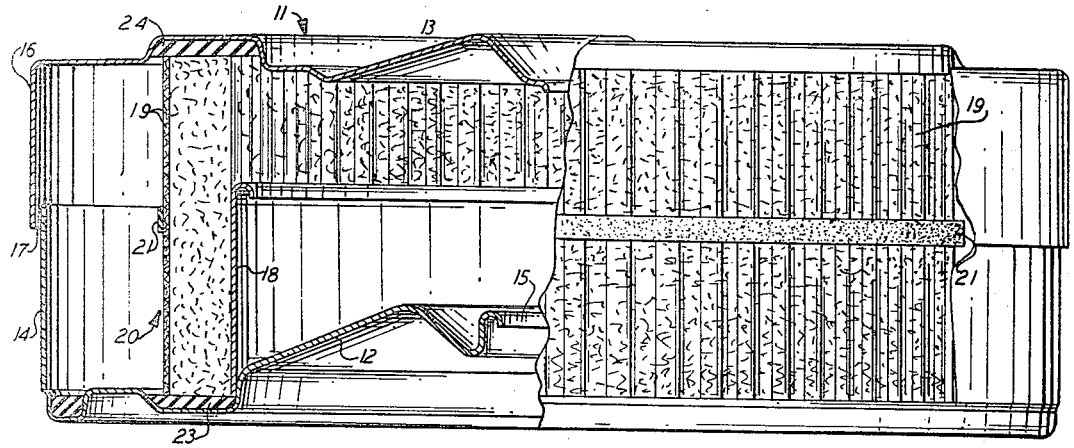
FIGURE 1 is a side elevation view of a fluid filter assembly according to this invention wherein a portion of the drawing has parts broken away and a portion of the drawing shows parts in section.

Referring now in detail to the drawings, the fluid filter assembly indicated generally at 11 has a tray 12 and a cover 13. Tray 12 has a central aperture 15 adapted to communicate with a charge forming device of an internal combustion engine. As will be described in detail below, tray 12 and cover 13 are maintained in the axially aligned, generally parallel spaced orientation shown in the drawings by the replaceable filter element or by any conventional locking means. Tray 12 has a vertically extending flange 14 which cooperates with the vertically extending flange 16 of cover 13 to enclose the filter assembly while permitting the flow of air to the interior of said assembly through space 17. Fabricated to tray 12 is a vertical support screen 18 having a continuous or endless form, that is, having a closed circumference. Support screen 18 is permeable to permit the passage of fluid therethrough.

Positioned around the support screen 18 is the replaceable filter element designated generally by the numeral 20. As can best be seen in FIGURES 2, 3, and 4, filter element 20 comprises a length of pleated filtering material 19, the ends of which are joined, as by clip 22, to form a continuous, endless unit of filtering material in the shape of an annulus. This filtering material may be paper or any other conventional filtering material that can be pleated for the construction of such a filter element. Bonded to the outer apexes of the pleats of the annulus of filtering material 19 is band 21 of elastomeric material such as rubber. The bond between band 21 and the outer apexes of the pleats of filtering material 19 may be accomplished by stapling or by the use of an adhesive or by any other suitable methods. The elasticity of band 21 is such that it will compress the pleats of filtering material 19 when there is no internal support for continuous filtering material 19.

Figure 4:
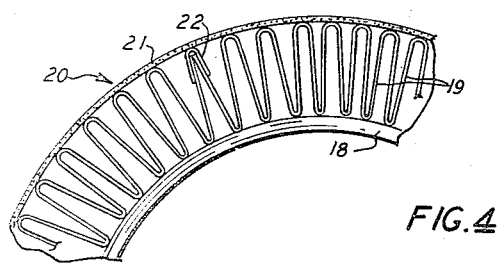
FIGURE 4 illustrates a portion of the filter element shown in FIGURES 2 and 3 and positioned in the fluid filter assembly.

Formed on tray 12 and cover 13 are continuous, endless seals 23 and 24 respectively. These seals are formed from poured foam or any other suitable resilient material. These seals are opposing and follow the outer periphery of support screen 18 which, as shown in FIGURE 4, is circular in the example illustrated in the drawing. However, it can be readily seen that screen 18 may have any desired closed configuration due to the construction of replaceable filter element 20 which would conform to a variety of shapes.

Figure 2:
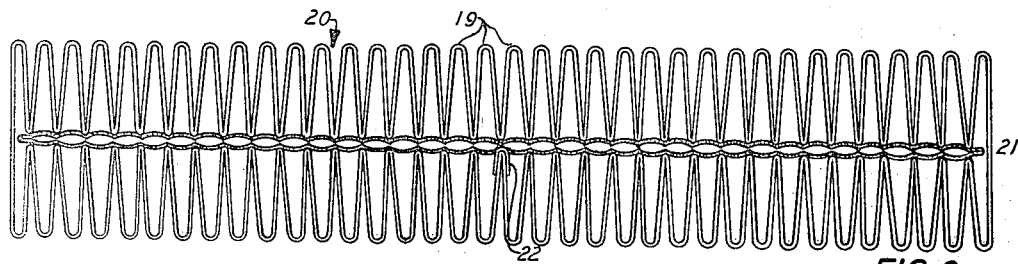
FIGURE 2 is a top view of a replaceable filter element according to this invention wherein said filter element is arranged for storage.

As can be seen in FIGURE 2, the orientation of filter element 20 is reversed for storage purposes. This is accomplished by reversing the inner and outer peripheries of the continuous filtering material, that is, the continuous filtering material 19 is turned "inside out." The continuous band 21 is thus positioned on the interior of the continuous filtering material and the filter element, due to its pleats, becomes flat ended so that it may readily be compressed into a compact rectangular shape for storage.

Figure 3:
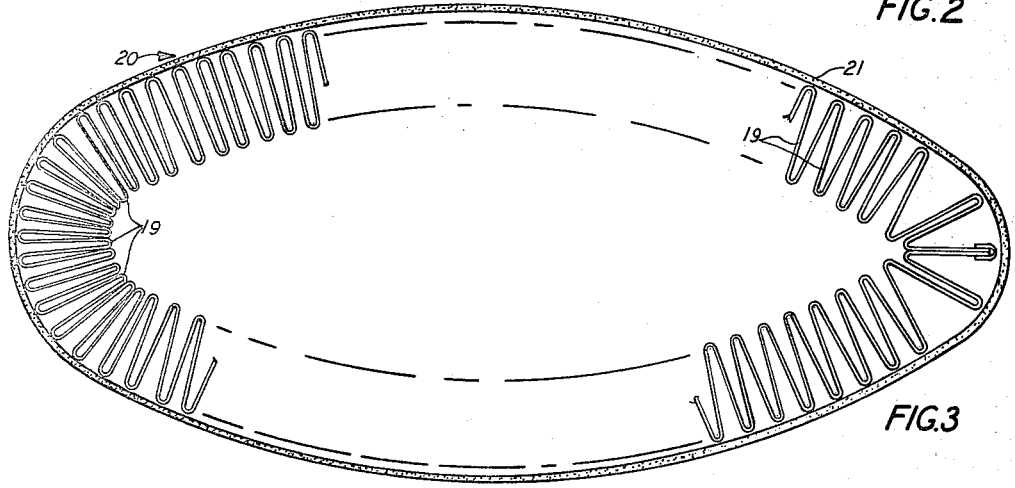
FIGURE 3 is a top view of the filter element of FIGURE 2 preparatory to the insertion of said filter element in the filter assembly.

Replacement of filter element 20 is accomplished by removing cover 13 and then removing the filter element 20 which has become readily accessible. A replacement element, taken from storage as shown in FIGURE 2, is prepared for the insertion in the filtering assembly 11 by reversing the orientation so that band 21 is positioned around the outer periphery of the filtering material as shown in FIGURE 3. The elastic force of band 21 may be overcome manually to spread the pleats of filtering material 19 so that filter element 20 may be positioned around support 18. It may readily be appreciated that once filter element 20 is positioned around support screen 18, band 21 will force the filtering material 19 into engagement with support screen 18. Cover 13 is then laid to rest on the filtering material 19 of filter element 20 and is supported thereby in spaced relationship relative to tray 12. The weight of cover 13 will cause a sealing engagement between the ends of continuous filtering material 19 and seals 23 and 24. Of course the cover 13 and tray 12 may be held against lateral movement by any conventional means. Air may thus enter through space 17 and flow through the filtering material 19 and into the inner chamber of the filter assembly and thence through aperture 15 to the charge forming device of the internal combustion engine.

I claim:

1. A fluid filter assembly comprising two axially aligned, spaced apart case members; a continuous, endless, permeable support screen joined to one of said case members and extending for at least part of the distance between said members; a continuous, endless length of pleated filtering material forming an annulus and positioned around the outer peripheral surface of said support screen; said annulus resting on one of said case members and supporting the other of said case members; and elastomeric means surrounding said annulus, contacting said material only at the outer apexes of the pleats and urging said filtering material into contact with said support screen.

2. A fluid filter assembly comprising two axially aligned spaced apart case members; a continuous, endless, permeable support screen joined to one of said members and extending for at least part of the distance between said members; a continuous, endless length of pleated filtering material forming an annulus and positioned around the peripheral surface of said support screen; said annulus resting on one of said case members and supporting the other of said case members; elastomeric means surrounding said annulus, contacting said material only at the outer apexes of the pleats and urging said filtering material into contact with said support screen; and two continuous, endless opposed seals, each of said seals being formed on one of said case members and contacting opposite surfaces of said annulus to form a fluid tight seal between said members and said filtering material.

3. A filtering element consisting of an endless member of pleated filtering material forming an annulus, and an endless band of elastomeric material bonded to said annulus and contacting said material only at the outer apexes of the pleats about the outer periphery of said annulus.

4. The filtering element according to claim 3, wherein said filtering material is paper.

5. A filtering element for the air cleaner of an internal combustion engine consisting of an endless member of pleated filtering material forming an annulus having an effective outer peripheral edge defined by the outer apexes of the pleats of said material, and an endless band of elastomeric material bonded to said effective edge, contacting said material only at said outer apexes and covering only a small portion of said effective edge about the midpoint of said edge.

References Cited

UNITED STATES PATENTS

| | | | |
|---|---|---|---|
| 2,279,423 | 4/1942 | Vokes | 210—493 |
| 2,312,999 | 3/1943 | DeLangen | 55—293 |
| 2,951,553 | 9/1960 | Kirby | 55—361 |
| 3,006,437 | 10/1961 | Lowther | 55—498 |
| 3,209,520 | 10/1965 | McKinlay | 55—276 |
| 3,241,680 | 3/1966 | Humbert | 210—493 |

FOREIGN PATENTS

| | | |
|---|---|---|
| 566,327 | 11/1958 | Canada. |
| 642,873 | 6/1962 | Canada. |
| 1,072,079 | 3/1954 | France. |
| 1,387,618 | 12/1964 | France. |
| 799,133 | 7/1958 | Great Britain. |
| 907,236 | 10/1962 | Great Britain. |

HARRY B. THORNTON, *Primary Examiner.*

BERNARD NOZICK, *Assistant Examiner.*

U.S. Cl. X.R.

55—210, 499, 500, 502, 503, 509, 521; 210—493